United States Patent [19]

Inui

[11] Patent Number: 4,510,818
[45] Date of Patent: Apr. 16, 1985

[54] DEVICE FOR PREVENTING REVERSE GEAR BUZZING IN A MANUAL TRANSMISSION

[75] Inventor: Masaki Inui, Toyota, Japan

[73] Assignee: Toyota Jidosha Kabushiki Kaisha, Japan

[21] Appl. No.: 479,876

[22] Filed: Mar. 29, 1983

[30] Foreign Application Priority Data

Nov. 19, 1982 [JP] Japan .......................... 57-175760[U]

[51] Int. Cl.³ .......................... G05G 9/12; G05G 5/10
[52] U.S. Cl. ........................................ 74/477; 74/411.5; 192/4 C
[58] Field of Search ............. 74/477, 526, 411.5; 192/4 C

[56] References Cited

U.S. PATENT DOCUMENTS

| | | | |
|---|---|---|---|
| 2,690,684 | 10/1954 | Stemler | 74/477 |
| 3,745,847 | 7/1973 | Worner et al. | 74/411.5 X |
| 4,221,283 | 9/1980 | Nordkvist et al. | 192/4 C X |
| 4,257,284 | 3/1981 | Ashauer et al. | 74/411.5 X |

FOREIGN PATENT DOCUMENTS

| | | | |
|---|---|---|---|
| 1159776 | 5/1959 | Fed. Rep. of Germany | 74/473 |
| 1680046 | 11/1980 | Fed. Rep. of Germany | 74/477 |
| 98451 | 8/1979 | Japan | 74/411.5 |
| 2066909 | 7/1981 | United Kingdom | 74/477 |

Primary Examiner—Allan D. Hermann
Assistant Examiner—Shirish Desai
Attorney, Agent, or Firm—Parkhurst & Oliff

[57] ABSTRACT

In combination with a manual transmission including a transmission casing, a forward speeds unit provided with a plurality of synchromesh mechanisms, a reverse unit provided with a selective sliding mesh mechanism, a lever shaft, an inner lever, an interlocking plate relatively rotatably mounted to the lever shaft and holding the inner lever at both ends, said interlocking plate serving to hold immovable at the neutral position the remaining shift heads other than one of the shift heads which is selected by the select operation of the inner lever; a device for preventing reverse gear buzzing comprises first front and rear engaging members of the forward speed shift head adjacent to the reverse shift head for releasably engaging with the inner lever when the inner lever is selected into the reverse position, a second front and rear engaging members provided on the reverse shift head, first means for contacting with the interlocking plate at the reverse select position, moving the reverse shift head and the forward shift head with the inner lever by a predetermined amount in the reverse shifting direction and thereafter disengaging the inner lever from the forward speed shift head.

6 Claims, 8 Drawing Figures

DEVICE FOR PREVENTING REVERSE GEAR BUZZING IN A MANUAL TRANSMISSION

BACKGROUND OF THE INVENTION

The present invention relates to a device for preventing reverse gear buzzing in a manual transmission.

As a reverse shifting operation in a manual transmission is conducted generally when the vehicle is stopped, in most cases reverse gear change has been performed by a selective sliding mesh unit of the reverse idler gear and no synchromesh unit has been provided. Thus, especially at the quick reverse gear change, the input shaft continues its inertial rotation to cause the clash of each gear when the reverse idler gear is meshed with a reverse gear, resulting in gear buzzing and consequently unpleasant feeling of the driver, and sometimes the shift feeling becomes worse, or the gear teeth may be broken in the worst case. As simple means for preventing the gear buzzing, there has been proposed an individual synchromesh unit for the reverse, but it is difficult to obtain a space for mounting the synchromesh unit and the provision of the unit increases in cost and weight, so such an individual synchromesh unit for the reverse will result in an undesirable means.

SUMMARY OF THE INVENTION

Accordingly, it is a primary object of the present invention to provide a device for preventing reverse gear buzzing caused by the meshing noise of the reverse idler gear at the reverse gear change, so as to eliminate unpleasant gear buzzing as well as to improve the shift feeling.

It is another object of the present invention to provide a device for preventing reverse gear buzzing which is compact, inexpensive and lighter in comparison with the means having an individual synchromesh unit for the reverse.

According to the present invention, in combination with a manual transmission for automotive vehicles including a transmission casing, a forward speeds unit provided with a plurality of synchromesh mechanisms and having shift heads for the forward speeds, a reverse unit provided with a selective sliding mesh mechanism of a reverse idler gear and having a reverse shift head, a shift-and-select lever shaft mounted in the transmission casing, an inner lever attached to the shift-and-select lever shaft and an interlocking plate relatively rotatably mounted to the shift-and-select lever shaft and holding the inner lever at its both ends, said interlocking plate serving to hold immovable at the neutral position the remaining shift heads other than one of said shift heads which is selected by the select operation of the inner lever; a device for preventing reverse gear buzzing comprises a first front engaging member of the forward speed shift head adjacent to the reverse shift head for releasably engaging with the inner lever when the inner lever is selected into the reverse position, a first rear engaging member provided on the forward shift head adjacent to the reverse shift head, a second front and rear engaging members provided on the reverse shift head, first means provided on the reverse shift head for contacting with the interlocking plate at the reverse select position, moving the reverse shift head and the forward shift head with the inner lever by a predetermined amount in the reverse shifting direction and thereafter disengaging the inner lever from the forward speed shift head and second means for preventing the interlocking plate from abutting against the rear engaging member of the forward speed shift head when the forward speed shift head moves in the reverse shifting direction by the predetermined amount.

With this arrangement, the synchronizing effect of the synchromesh unit for the forward speeds which is shifted in the same direction as the reverse shift direction may be utilized for the reverse shifting operation, thereby stopping or slowing down the inertial rotation of the input shaft.

The invention will become more fully apparent from the claims and the description as it proceeds in connection with the drawings.

DETAILED DESCRIPTION OF THE PREFERRED EMBODIMENTS

Figure 1:
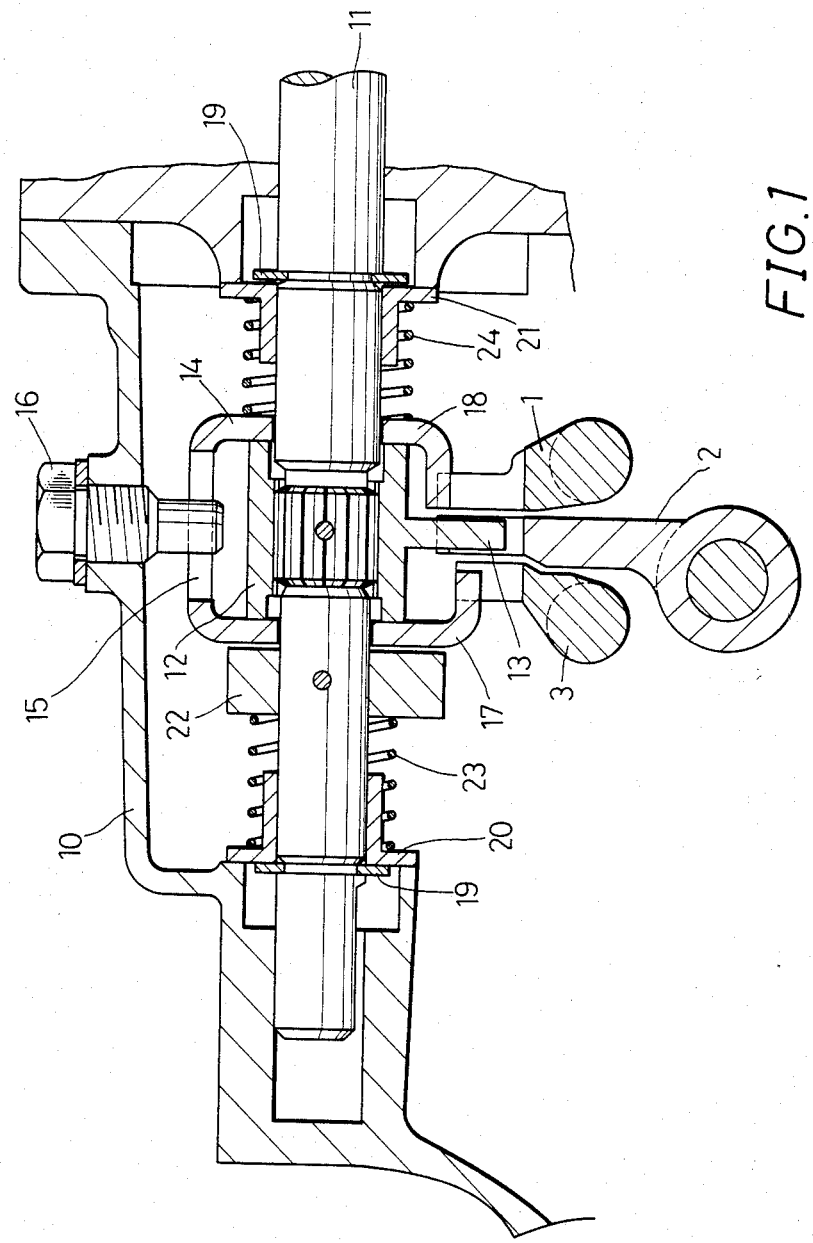
FIG. 1 is a front view of a shift-and-select mechanism in a manual transmission of an embodiment of the present invention.

Referring now to FIG. 1 which shows a shift-and-select mechanism in a manual transmission including five forward speeds and reverse, provided with a first-/second speeds synchromesh unit, a third/fourth speeds synchromesh unit, a fifth speed synchromesh unit and a selective sliding mesh unit of a reverse idler gear. The shift-and-select mechanism which is put in its neutral position in FIG. 1 has a transmission casing 10 and a shift-and-select lever shaft 11 mounted in the casing 10. An inner lever 12 is attached to the lever shaft 11 and has a projection 13 at the lower end thereof and a second shift head 2 is engaged with the projection 13. A first shift head 1 is disposed on the right-hand side of the second shift head 2 and a third shift head 3 is disposed on the left-hand side of the second shift head 2 as viewed in FIG. 1. The first shift head 1 is connected to the first/second speeds synchromesh unit, the second shift head 2 to the third/fourth speeds synchromesh unit, and the third shift head 3 to the fifth speed synchromesh unit and the selective sliding mesh unit for the reverse. By axial movement or selecting operation of the shift-and-select lever shaft 11, the projection 13 of the inner lever 12 is selectively engaged with one of the shift heads 1, 2 and 3, and the selected shift head is slided forwardly or backwardly by rotation or shifting operation of the lever shaft 11 to perform a speed change operation. In other words, six speeds change may be obtained by backward movement of the first shift head 1 for the first speed, forward movement of the first shift head 1 for the second speed, backward movement of the second shift head 2 for the third speed, forward movement of the second shift head 2 for the fourth speed, backward movement of the third shift head 3 for the fifth speed and forward movement of the third shift head 3 for the reverse.

Figure 2:
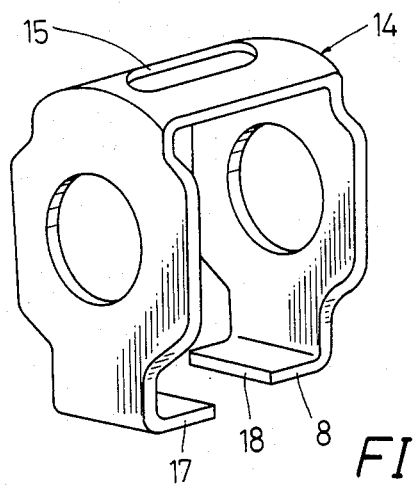
FIG. 2 is a perspective view of an interlocking plate.
Figure 3:
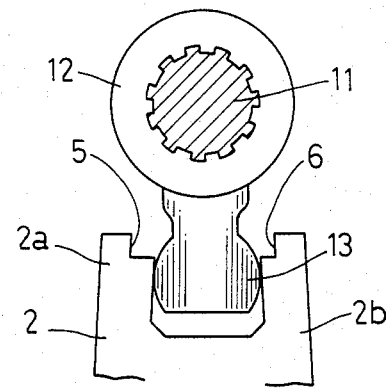
FIG. 3 is an enlarged side elevational view of an inner lever.
Figure 4:
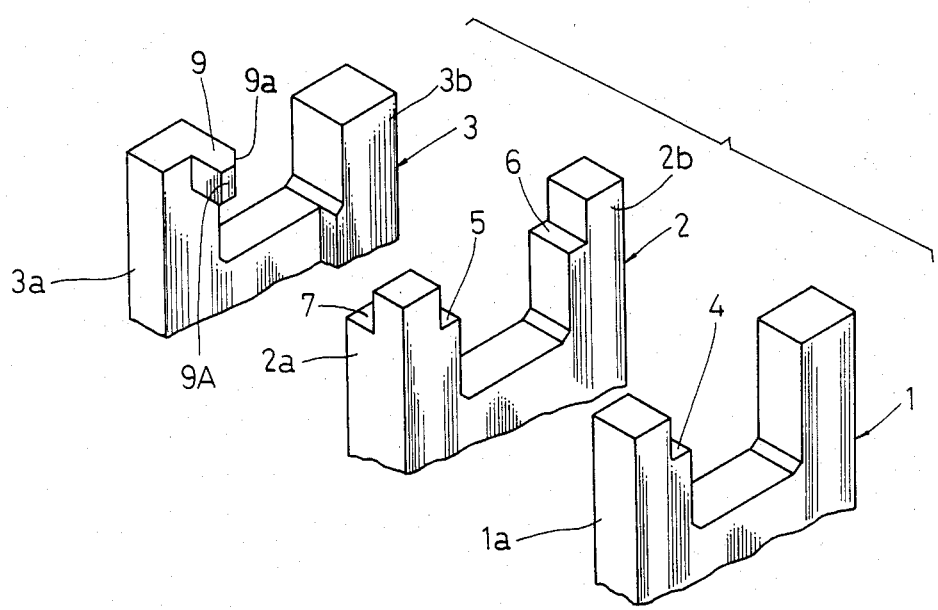
FIG. 4 is a perspective view of first, second and third shift heads.

The manual transmission is provided with an interlocking unit as will be hereinafter described. An interlocking plate 14 shown in FIG. 2 is relatively rotatably attached to the shift-and-select lever shaft 11, surrounding the inner lever 12. In other words, the interlocking plate 14 holds the inner lever 12 at its both ends and the lever shaft 11 is loosely inserted into the interlocking plate 14 in such a manner as to permit the rotation of the lever shaft 11. The interlocking plate 14 has at the upper surface thereof an elongated slot 15. A lock bolt 16 is threadedly attached to the upper surface of the transmission casing 10 and the shank of the lock bolt 16 protrudes into the slot 15 in such a manner that the interlocking plate 14 is permitted to axially move together with the lever shaft 11 but is prohibited to rotate relative to the transmission casing 10. The interlocking plate 14 has right and left lock members 18 and 17 facing to each other at its lower portion. When one of the shift heads 1, 2 and 3 is engaged with the inner lever 12, the other two shift heads are held immovable in this way at the neutral position of the shift operation, simultaneous shifting to two shift heads or double shifting is prevented. Right and left E-rings 19 are secured on the shift-and-select lever shaft 11, and right and left seats 21 and 20 are slidably disposed on the lever shaft 11. A holding lever 22 is fixed on the lever shaft 11. A left return spring 23 is interposed between the left seat 20 and the holding lever 22, and a right return spring 24 is interposed between the interlocking plate 14 and the right seat 21.

Figure 5:
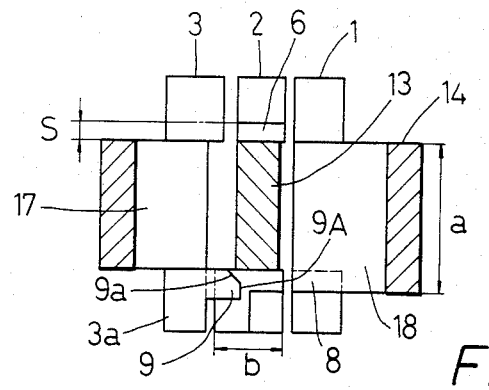
FIGS. 5 to 8 are plan views illustrating the engagement of the inner lever and the interlocking plate with the shift heads in the order of the operational steps of the reverse shift.

Now the device for preventing reverse gear buzzing provided in the above manual transmission will be described, referring to FIGS. 1 to 5. The right lock member 18 is arranged at higher level than the left lock member 17 and has the width greater than that of the left lock member 17 as shown in FIG. 5. The first and second shift heads 1 and 2 have front engaging pieces 1a and 2a with notches 4 and 5 which are adapted to be engaged with the right lock member 18, respectively. The third shift head 3 has a rear engaging piece 3b having a smaller height than a rear engaging piece 2b of a second shift head which will be hereinafter referred so that the right lock member 18 will not butt against it during shifting into the reverse position. The front engaging piece 2a of the second shift head 2 adjacent to the reverse shift head or the third shift head 3 has the width b greater than the rear engaging piece 2b so as to be engaged with the projection 13 of the inner lever 12 when the fifth speed or the reverse is selected (hereinafter referred to as "when the reverse is selected"). The second shift head 2 has a rear engaging piece 2b provided with a notch 6 which is adapted to define a clearance S relative to the right lock member 18 of the interlocking plate 14 during the reverse shifting operation as shown in FIG. 5. The clearance S permits forward movement of the second shift head 2 or the shifting into the fourth speed until it is finished. The front engaging piece 2a of the second shift head 2 has a notch 7 at the left upper portion thereof. A front engaging piece 3a of the third shift head 3 has an engaging projection 9 on the right side thereof which is adapted to get into the notch 7 of the second shift head 2. The engaging projection 9 has a stopper surface 9A and a guide bevel 9a. The stopper surface 9A is adapted to contact with the corner 8 of the right lock member 18 of the interlocking plate 14 when the reverse is selected and the guide bevel 9a serves to guide the corner 8 in such a manner that the corner 8 may slide on the guide bevel 9a upon the shifting into the reverse position. When the interlocking plate 14 slides along the guide bevel 9a during shifting into the reverse position, the inner lever 12 is leftwardly moved to disengage the projection 13 of the inner lever 12 from the front engaging piece 2a of the second shift head 2. The disengagement occurs directly before the clearance S is filled up by the reverse shift in such a manner as to get only the synchronizing effect of the synchromesh unit by the second shift head 2 but to avoid double shifting to the fourth speed and the reverse.

Figure 6:
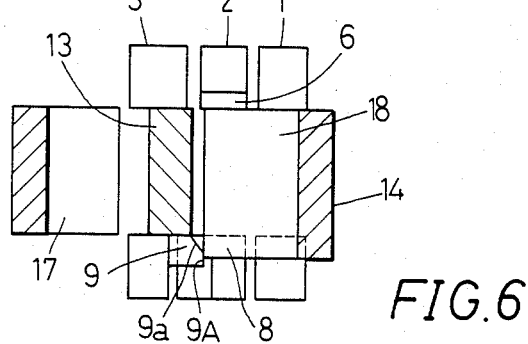
Figure 7:
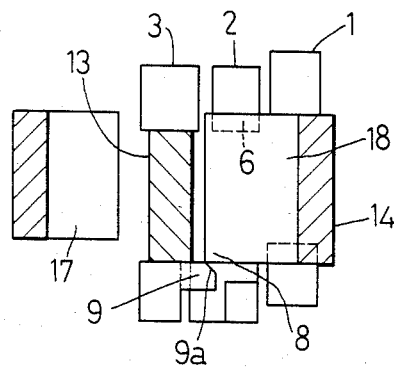
Figure 8:
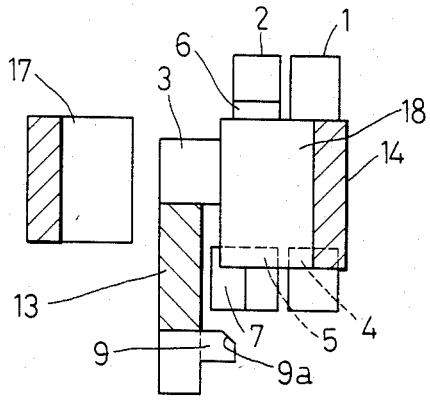

In operation of the device for preventing reverse gear buzzing constructed above, positional relationship of the projection 13 of the inner lever 12 and the lock members 17 and 18 of the interlocking plate 14 will be described in the order of the operations referring to FIGS. 5 to 8. In the neutral position as shown in FIG. 5, the projection 13 of the inner lever 12 is engaged with the second shift head 2, and the lock members 18 and 17 are engaged with the first and third shift heads 1 and 3, respectively. When the shift-and-select lever shaft 11 is put to select the fifth speed and the reverse, the projection 13 of the inner lever 12 is moved to engage with the third shift head 3 and also with the second shift head 2, as is shown in FIG. 6, and at this time, the corner 8 of the lock member 18 of the interlocking plate 14 is abutted against the stopper surface 9A of the engaging projection 9 of the third shift head 3. When the lever shaft 11 is shifted into the reverse, the third shift head 3 is moved or shifted together with the second shift head 2 by the projection 13 of the inner lever 12. The corner 8 of the lock member 18 of the interlocking plate 14 slides along the guide bevel 9a of the engaging projection 9 of the third shift head 3 to leftwardly move the inner lever 12, and then the projection 13 of the inner lever 12 is disengaged from the second shift head 2 as shown in FIG. 7. The above movement of the second shift head 2 by means of the inner lever 12 gives the synchronizing effect as to shifting into the fourth speed, thereby stopping or slowing down the inertial rotation of the input shaft (not shown). At this time, the reverse idler gear (not shown) is not yet starting meshing with a reverse drive gear and a reverse driven gear. As the reverse shift is further continued, the projection 13 of the inner lever 12 begins to move only the third shift head 3 (See FIG. 8 where the shifting is completed.) to mesh the reverse idler gear with the reverse drive gear and the reverse driven gear, and now the reverse shifting is completed. When the reverse shifting is finished, the second shift head 2 is restored to its original position by elastic means (not shown). In order to return the shift position from the reverse to the neutral position, each member is restored to its original position by reversing the procedure outlined above.

While the invention has been described with reference to a preferred embodiment thereof, it is to be understood that modifications or variations may be easily made without departing from the scope of the present invention which is defined by the appended claims.

What is claimed is:

1. In combination with a manual transmission for automotive vehicles including a transmission casing, a forward speeds unit provided with a plurality of synchromesh mechanisms and having shift heads for the forward speeds, a reverse unit provided with a selective sliding mesh mechanism of a reverse idler gear and having a reverse shift head, a shift-and-select lever shaft mounted in said transmission casing, an inner lever attached to said shift-and-select lever shaft and an interlocking plate relatively rotatably mounted to said shiftand-select lever shaft and holding said inner lever at its both ends, said interlocking plate serving to hold immovable at the neutral position the remaining shift heads other than one of said shift heads which is selected by the select operation of said inner lever; a device for preventing reverse gear buzzing comprising:

- a first front engaging member of the forward speed shift head adjacent to said reverse shift head for releasably engaging with said inner lever when said inner lever is selected into the reverse position;
- a first rear engaging member provided on said forward shift head adjacent to said reverse shift head;
- a second front and rear engaging members provided on said reverse shift head;
- first means for contacting with said interlocking plate at the reverse select position, moving said reverse shift head and said forward shift head with said inner lever by a predetermined amount in the reverse shifting direction and thereafter disengaging said inner lever from said forward speed shift head, said first means being provided on said reverse shift head; and
- second means for preventing said interlocking plate from abutting against said rear engaging member of said forward speed shift head when said forward speed shift head moves in the reverse shifting direction by said predetermined amount.

2. The device as defined in claim 1, wherein said first front engaging member of said forward speed shift head has a greater width than said first rear engaging member.

3. The device as defined in claim 1, wherein said first means includes a stopper surface adapted to abut against the corner portion of said interlocking plate and a bevel surface for slidably moving said corner portion thereon, and projects from said second front engaging member of said forward speed shift head.

4. The device as defined in claim 3, wherein said first front engaging member of said forward speed shift head includes a first notch for receiving said first means thereinto.

5. The device as defined in claim 1, wherein said second means is comprised of a second notch provided on said first rear engaging member of said forward speed shift head.

6. The device as defined in claim 1, wherein said second rear engaging member of said reverse shift head has a smaller height than said first rear engaging member of said forward speed shift head, so as to prevent said interlocking plate from abutting thereagainst upon the shifting to the reverse.

* * * * *